Nov. 3, 1953   J. R. BARROW   2,658,133
ELECTRODE HOLDER
Filed July 28, 1950
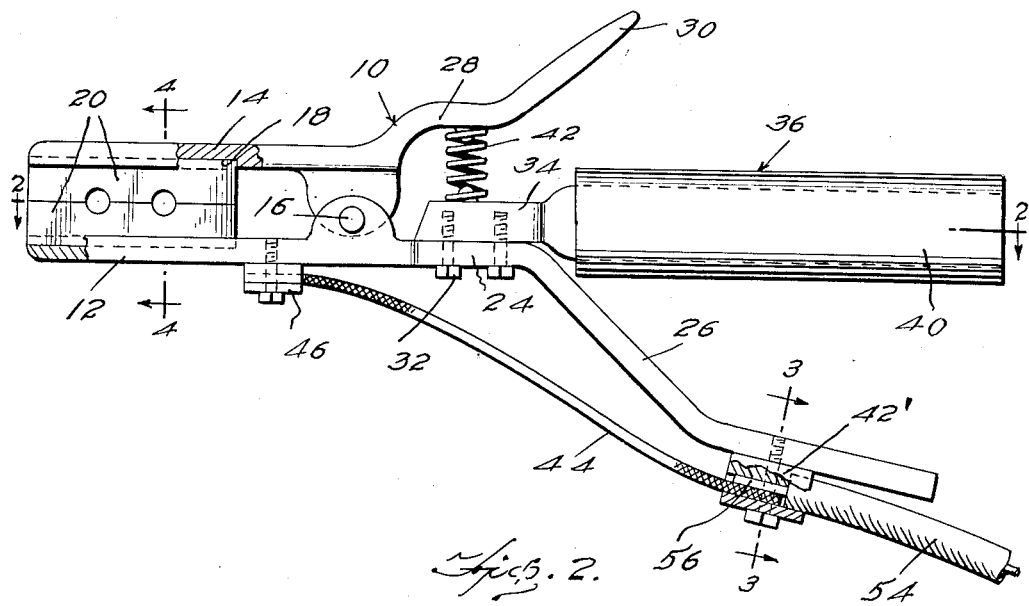
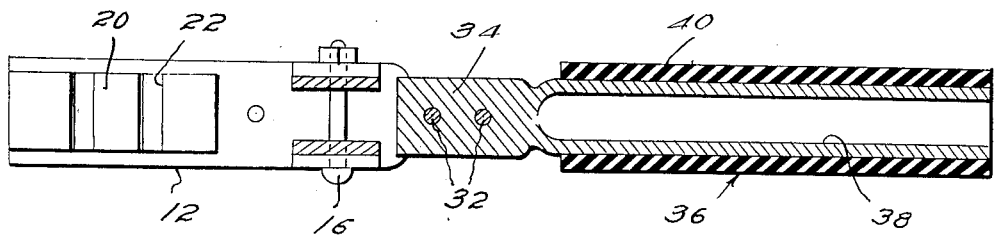
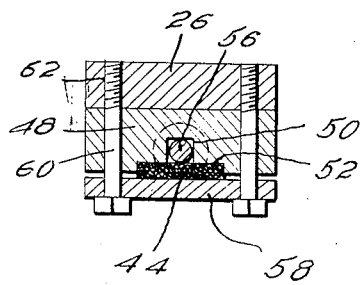
INVENTOR.
James R. Barrow
BY
Wilfred E. Lawson
ATTORNEY Patented Nov. 3, 1953

2,658,133

UNITED STATES PATENT OFFICE 2,658,133

ELECTRODE HOLDER

James R. Barrow, Columbiana, Ohio, assignor to Columbiana Boiler Company, Columbiana, Ohio, a corporation of Ohio Application July 28, 1950, Serial No. 176,307

1 Claim. (Cl. 219—8)

This invention relates to an electrode holder and more particularly to a holder of the type employed for holding welding rod during a welding operation.

Welding rod holders of the type to which this invention relates commonly convey the electrical energy to be delivered to the welding rod through the handle of the device by which it is manipulated by the operator. Owing to the high density of electrical energy delivered to the welding rod or electrode, and the resistances encountered considerable heat is generated and when the conductor extends through the handle much discomfort and inconvenience is experienced by the user. As a result various types of heat radiating devices have been proposed, and employed, in an effort to avoid such discomfort and inconvenience. The application of heat radiating devices to the handles or welding rod holders not only increase the bulk of the handle, but also frequently interfere with the maneuverability of the holder.

The primary object of this invention is to avoid the transmission of electrical energy through the handle of a welding rod holder and consequently eliminate the heating of the handle thereof.

Another object is to conduct the electrical energy delivered from the cable directly to one of the jaw members in which the electrode is clamped and hence to by-pass much of the electrode holder and consequently avoid the dissipation of the electrical energy through the heating of the holder.

The above and other objects may be attained by employing this invention which embodies among its features a pair of jaw members pivotally connected together, a cable supporting arm on one of the jaw members to which the power supplying cable of a welding unit is coupled, and a conductor extending from the cable coupling to a jaw member adjacent an electrode held in the device.

Other features include a handle carried by the cable supporting arm in spaced relation to the cable and the conductor.

In the drawings:

Figure 1 is a side view of an electrode holder embodying the features of this invention, Figure 2 is a horizontal sectional view taken substantially along the line 2—2 of Figure 1, Figure 3 is an enlarged sectional view taken substantially along the line 3—3 of Figure 1, and Figure 4 is an enlarged sectional view taken substantially along the line 4—4 of Figure 1.

Referring to the drawings in detail this electrode holder designated generally 10 comprises a pair of jaw members 12 and 14 which are pivotally connected together as at 16. As illustrated these jaw members are of substantially elongated rectangular form, and each is provided in an adjacent face with a groove 18 in which a highly conducting electrode holding block 20 is fitted. The adjacent faces of the blocks 20 are provided with mating grooves 22 in which electrodes such as welding rods are clamped. Carried by the jaw member 12 and extending longitudinally therefrom beyond the pivot 16 is a cable holding arm 24 having an angular extension 26 projecting therefrom at the end thereof remote from the jaw member 12 and formed on the jaw member 14 and extending longitudinally therefrom at the end thereof adjacent the pivot 16 is an offset extension 28 which terminates at its end remote from the jaw member 14 in an angularly extending electrode release lever 30. As illustrated the extension 26 and the lever 30 diverge as they recede from the jaw members.

Secured as by screws 32 to the arm 24 on the side thereof adjacent the offset portion 26 of the jaw member 14 is the shank end 34 of a handle designated generally 36. This handle comprises in addition to the shank member 34 a tubular extension 38 which is surrounded by a covering 40 of non-conducting material such as rubber to form a grip by which the holder 10 may be manipulated. Extending between the offset extension 28, and the shank 34 of the handle 36 is a compression coil spring 42 which bears against the parts 28 and 34 in order to yieldingly hold the jaw members 12 and 14 in clamping position on a welding rod or like electrode.

Fixed to the angular extension 26 of the arm 24 is a clamp 42' in which one end of a flexible conductor 44 is held. The opposite end of this conductor 44 is secured in a clamp 46 carried by the jaw member 12 adjacent the block 20 therein so that electrical energy flowing from the clamp 42' through the conductor 44 and clamp 46 will be delivered through the jaw member 12 to the block 20 therein. The clamp 42 comprises a base plate 48 having a groove 50 extending longitudinally therethrough which opens into a longitudinal groove 52 in which the conductor 44 is seated. A conventional electrical cable 54 containing a conventional conductor 56 is led into the clamp 42 with the conductor 56 lying in the groove 50 so as to effect good electrical contact with the conductor 44. A clamp plate 58 engages the conductor 44 to press it firmly against the conductor 56 when the screws 60 are tightened. The threaded ends of the screws 60 are received at internally screw threaded openings 62 formed in the angular extension 26 and serve not only to hold the clamp 42′ in place but also to cause the clamp plate 58 to bear against the conductor 44 to press it against the conductor 50.

In use it will be evident that electrical energy flowing from the power source through the conductor 56 of the cable 54 will be conveyed directly through the conductor 44 to the jaw member 12 adjacent its conducting block 20 in which an electrode is supported by the block 20 of the jaw 14. By thus by-passing the major portion of the electrode holder, much of the resistance encountered in the flow of electrical energy from the cable 54 to the electrode will be eliminated and consequently heating of the device will be avoided. Moreover owing to the fact that the handle 36 is disposed in spaced relation to the conductors, no heating of the handle will be experienced and any heat that may be conducted to it will be radiated through the tubular member 38 to atmosphere.

While in the foregoing there has been shown and described the preferred form of this invention, it is to be understood that minor changes in the details of construction, combination and arrangement of parts may be resorted to without departing from the spirit and scope of the invention as claimed.

I claim:

In a holder for welding electrodes, a pair of parallel elongated jaws pivoted together adjacent their inner ends, oppositely and outwardly angled extensions, constituting jaw operating hand grips, projecting rearwardly from the inner ends of said jaws, a shank extending rearwardly from one of said jaws in line therewith, a hand grip of an insulating material on said shank, a coil spring interposed between the connected end of said shank and the extension of the other of said jaws to maintain the jaws in electrode gripping relation, the extension from the said one jaw being of a greater length than that of the extension from the other jaw, a clamp mounted on the outer side of the said one jaw to secure a bared end of an electrical conductor thereto, and a second clamp mounted on the outer side of the extension from the said one jaw adjacent its free end to support an insulated portion of said conductor in spaced relation with respect to the holder to prevent interference therefrom during the manipulation of the holder and any undue heating up of portions of the holder other than the said jaws thereof.

JAMES R. BARROW.

References Cited in the file of this patent

UNITED STATES PATENTS

| Number | Name | Date |
|---|---|---|
| 1,384,439 | Eschholz | July 12, 1921 |
| 2,003,196 | Jackson | May 28, 1935 |
| 2,386,399 | Jackson | Oct. 9, 1945 |
| 2,387,888 | Donnelly, Jr. | Oct. 30, 1945 |
| 2,400,903 | Allen | May 28, 1946 |
| 2,404,437 | Donnelly, Jr. | July 23, 1946 |

FOREIGN PATENTS

| Number | Country | Date |
|---|---|---|
| 408,364 | Great Britain | Apr. 12, 1934 |
| 564,229 | Great Britain | Sept. 19, 1944 |
| 580,452 | Great Britain | Sept. 9, 1946 |
| 623,304 | Great Britain | May 16, 1949 |